US010281271B2

(12) United States Patent
Tokuda et al.

(10) Patent No.: US 10,281,271 B2
(45) Date of Patent: May 7, 2019

(54) SURVEYING INSTRUMENT

(71) Applicant: TOPCON Corporation, Tokyo-to (JP)

(72) Inventors: Yoshihiko Tokuda, Tokyo-to (JP); Satoshi Nakamura, Tokyo-to (JP); Yosuke Okudaira, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 164 days.

(21) Appl. No.: 15/402,599

(22) Filed: Jan. 10, 2017

(65) Prior Publication Data

US 2017/0205229 A1 Jul. 20, 2017

(30) Foreign Application Priority Data

Jan. 18, 2016 (JP) .................................. 2016-007034

(51) Int. Cl.
*G01C 3/04* (2006.01)
*G01C 15/00* (2006.01)
*G01C 5/00* (2006.01)

(52) U.S. Cl.
CPC ............... *G01C 3/04* (2013.01); *G01C 5/00* (2013.01); *G01C 15/00* (2013.01); *G01C 15/004* (2013.01)

(58) Field of Classification Search
CPC ........ G01C 3/04; G01C 15/00; G01C 15/002; G01C 15/004
USPC .................................. 33/279, 278, 290, 292
See application file for complete search history.

(56) References Cited

U.S. PATENT DOCUMENTS

| 5,475,930 A * | 12/1995 | Kimura | F16H 1/16 33/290 |
| 5,689,892 A * | 11/1997 | Beckingham | G01C 1/02 33/1 N |
| 5,949,548 A * | 9/1999 | Shirai | G01C 15/002 250/559.38 |
| 6,044,567 A * | 4/2000 | Feist | G01C 1/02 33/290 |
| 6,046,800 A * | 4/2000 | Ohtomo | G01C 15/002 356/139.07 |
| 6,354,010 B1 * | 3/2002 | Shirai | G01C 1/02 33/284 |
| 6,622,391 B1 * | 9/2003 | Shirai | G01C 1/02 33/1 PT |
| 2002/0138998 A1 * | 10/2002 | Hamada | G01C 1/02 33/290 |

(Continued)

FOREIGN PATENT DOCUMENTS

| JP | 2-303378 A | 12/1990 |
| JP | 11-311517 A | 11/1999 |

(Continued)

*Primary Examiner* — Christopher W Fulton
(74) *Attorney, Agent, or Firm* — Nields, Lemack & Frame, LLC

(57) ABSTRACT

The invention provides a surveying instrument, which comprises a frame unit provided capable of rotating horizontally via a horizontal rotation shaft, a telescope unit provided capable of rotating vertically via a vertical rotation shaft in a recessed portion formed in the frame unit, a vertical rotation driving unit in which a vertical output shaft is connected to the vertical rotation shaft, and a whirl-stop unit provided on an outer side of a side plate of the frame unit along the side plate and connecting the vertical rotation driving unit and the frame unit to each other.

5 Claims, 5 Drawing Sheets

(56) References Cited

U.S. PATENT DOCUMENTS

| | | | |
|---|---|---|---|
| 2007/0064217 A1* | 3/2007 | Li | G01C 1/02 |
| | | | 356/5.01 |
| 2009/0235541 A1* | 9/2009 | Kumagai | G01C 15/004 |
| | | | 33/281 |
| 2010/0088910 A1* | 4/2010 | Svanholnn | G01C 1/04 |
| | | | 33/290 |
| 2013/0174432 A1* | 7/2013 | Kumagai | G01C 15/002 |
| | | | 33/286 |
| 2014/0196293 A1 | 7/2014 | Kodaira et al. | |
| 2016/0178365 A1* | 6/2016 | Faix | H02K 21/24 |
| | | | 356/4.01 |

FOREIGN PATENT DOCUMENTS

| | | |
|---|---|---|
| JP | 2003-199370 A | 7/2003 |
| JP | 2014-137299 A | 7/2014 |

\* cited by examiner

SURVEYING INSTRUMENT

BACKGROUND OF THE INVENTION

The present invention relates to a surveying instrument for sighting a measuring point by horizontally rotating a frame and vertically rotating a telescope by motors and for performing a distance measurement and an angle measurement.

A surveying instrument, for instance, a total station, has a telescope unit for sighting a measuring point. The telescope unit is rotatably supported by a frame unit in a vertical direction, and the frame unit is rotatably supported by a base unit in a horizontal direction. Further, the total station has a motor for rotating the telescope unit and a motor for rotating the frame unit.

As a conventionally used motor, an ultrasonic motor and a stepping motor are used, for instance. In these motors, in a case where an output shaft of the motor and a rotation shaft are connected to each other, an eccentricity is occurred between the output shaft and the rotation shaft due to a dimensional error, a mounting error and the like. Therefore, it is necessary to provide a mechanism for absorbing the eccentricity.

Conventionally, a coupling is provided at a connecting portion between the output shaft of the motor and the rotation shaft, for instance, and the eccentricty between the output shaft of the motor and the rotation shaft is absorbed by the coupling. However, by providing the coupling, the motor and its peripheral part become bulky, and a space in a frame is narrowed, which prevented a provision of other components.

It is to be noted that Japanese Patent Publication Laid-open. No. H11-311517 discloses a surveying instrument in which an arm of the ultrasonic motor extending from a motor case is fixed to an extension rod extending from a columnar portion via a universal joint and an eccentricity between the motor case and the columnar portion caused by the dimensional error or the mounting error is absorbed by the universal joint.

SUMMARY OF THE INVENTION

It is an object of the present invention to provide a surveying instrument which prevents an eccentricity between a vertical rotation shaft and a vertical rotation driving unit of a telescope unit.

To attain the object as described above, a surveying instrument according to the present invention comprises a frame unit provided capable of rotating horizontally via a horizontal rotation shaft, a telescope unit provided capable of rotating vertically via a vertical rotation shaft in a recessed portion formed in the frame unit, a vertical rotation driving unit in which a vertical output shaft is connected to the vertical rotation shaft, and a whirl-stop unit provided on an outer side of a side plate of the frame unit along the side plate and connecting the vertical rotation driving unit and the frame unit to each other.

Further, in the surveying instrument according to the present invention, the vertical rotation driving unit comprises the vertical output shaft in which a forward end portion is connected to the vertical rotation shaft via an output flange, and a base end portion protrudes from the frame unit and a fixing nut is screwed thereon, a fixing plate fitted rotatably and slidably with the vertical output shaft, an output-shaft pressing component interposed between the fixing plate and the fixing nut, an intermediate fixed plate fixed to the fixing plate, a vibration generating component provided on an outer circumferential portion of the intermediate fixed plate, and a rotating plate fitted rotatably and slidably with the vertical output shaft, and wherein the rotating plate is in close contact with the vibration generating component via a first friction component by a pressing force from the output-shaft pressing component and is in close contact with the output flange via a second friction component generating a friction torque smaller than the friction torque of the first friction component.

Further, in the surveying instrument according to the present invention, the whirl-stop unit comprises a joint holder fixed to the frame unit, a hole portion formed in a lower part of the joint holder, a ball holder having a steel ball accommodated in the hole portion and pressed by a steel-ball pressing component, a pin accommodating hole formed in an inner surface of the hole portion facing the ball holder, a connection plate fixed to the fixing plate and extending downward to the hole portion, a connection element held by the connection plate so as to be located between the ball holder and the pin accommodating hole, a pin receiving hole drilled in the connection element and concentric with the pin accommodating hole, and a connection pin provided by spanning between the pin accommodating hole and the pin receiving hole, and wherein the steel ball comes into contact on a side opposite to the pin receiving hole with a surface of the connection element.

Further, in the surveying instrument according to the present invention, diameters of the pin accommodating hole and the pin receiving hole are larger than the diameter of the connection pin.

Furthermore, in the surveying instrument according to the present invention, both ends of the connection pin are in a spherical shape, and hole bottoms of the pin accommodating hole and the pin receiving hole are in a conical shape.

According to the present invention, the surveying instrument comprises a frame unit provided capable of rotating horizontally via a horizontal rotation shaft, a telescope unit provided capable of rotating vertically via a vertical rotation shaft in a recessed portion formed in the frame unit, a vertical rotation driving unit in which a vertical output shaft is connected to the vertical rotation shaft, and a whirl-stop unit provided on an outer side of a side plate of the frame unit along the side plate and connecting the vertical rotation driving unit and the frame unit to each other. As a result, the eccentricity occurred due to an error when the vertical rotation shaft and the vertical output shaft are connected to each other can be absorbed, the vertical rotation shaft and the vertical output shaft is connected to each other by a bolt, and a space inside the frame unit can be saved.

DETAILED DESCRIPTION OF THE PREFERRED EMBODIMENT

Figure 1:
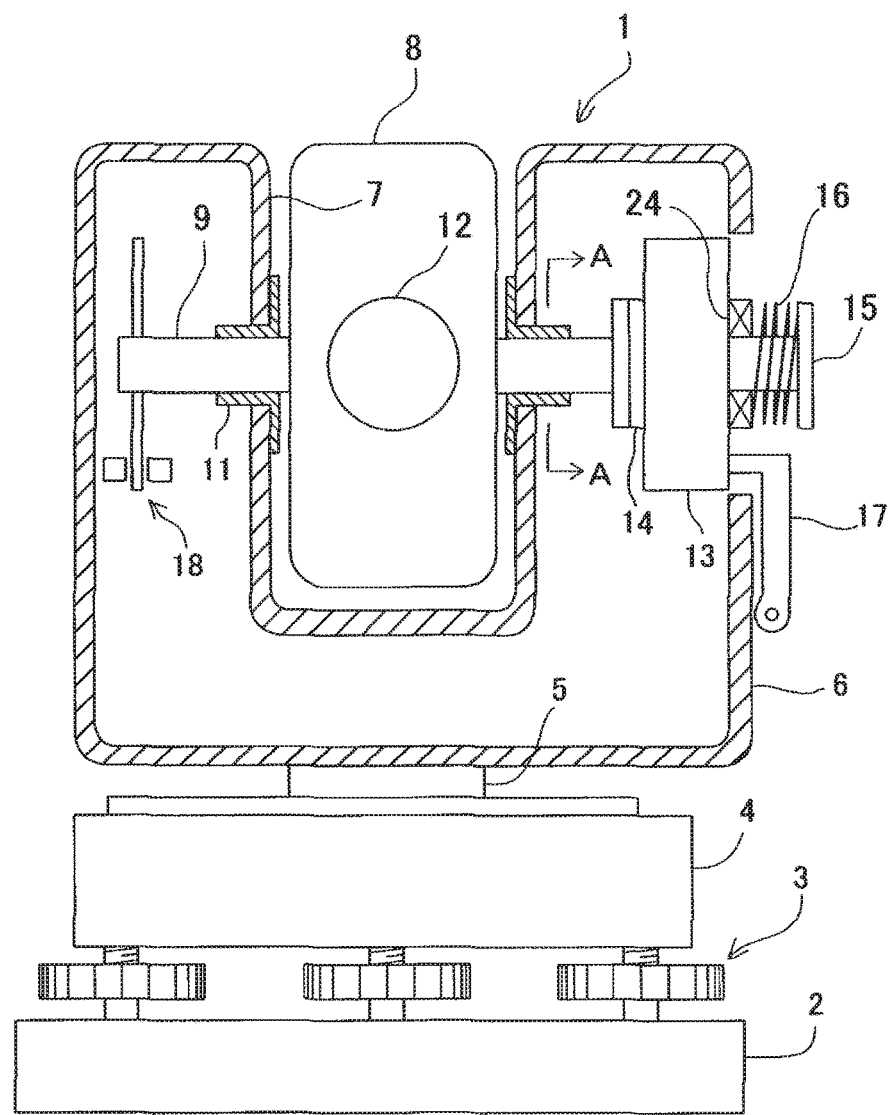
FIG. 1 is a frontal cross-sectional view to show a surveying instrument according to an embodiment of the present invention.

A description will be given below on an embodiment of the present invention by referring to the attached drawings.

First, a description will be given on a surveying instrument 1 according to the embodiment of the present invention by referring to FIG. 1 to FIG. 4. It is to be noted that, in FIG. 1, a left side with respect to a paper surface is assumed to be a forward end side, and a right side with respect to the paper surface is assumed to be a base end side. Further, in FIG. 3, the right side with respect to the paper surface is assumed to be the forward end side, and the left side with respect to the paper surface is assumed to be the base end side.

A leveling unit 3 is provided on a pedestal unit 2, and a base unit 4 is provided on the leveling unit 3. A horizontal rotation driving unit (not shown) is accommodated in the base unit 4, and the horizontal rotation driving unit has a horizontal rotation shaft 5 extending vertically. Further, a frame unit 6 is mounted on an upper end of the horizontal rotation shaft 5.

Figure 2:
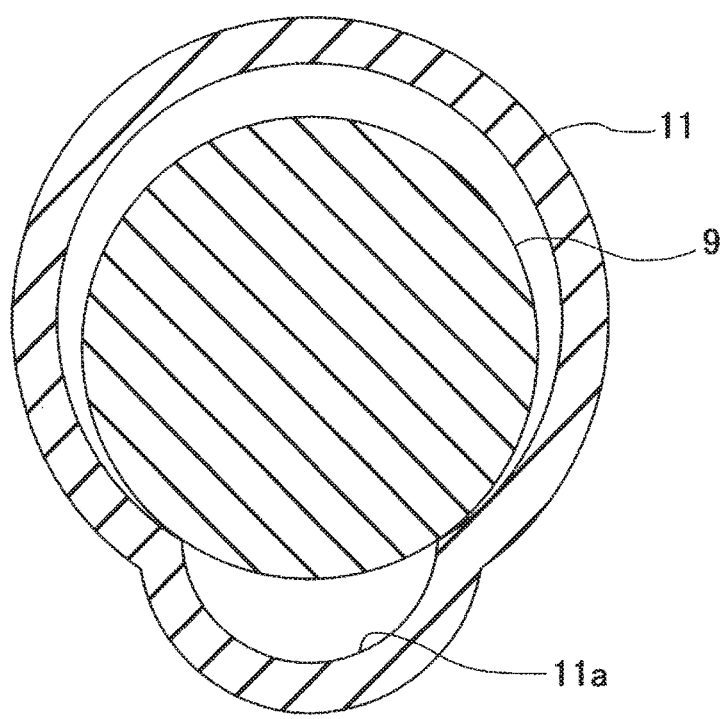
FIG. 2 is an arrow diagram along the line A-A in FIG. 1.

The frame unit 6 has a recessed portion 7, and a telescope unit 8 is accommodated in the recessed portion 7. The telescope unit 8 is supported by a vertical rotation shaft 9, and the vertical rotation shaft 9 is rotatably supported by the frame unit 6 via two right and left bearings 11. It is to be noted that, as shown in FIG. 2, the bearing 11 is a slide bearing in which a recessed portion 11a is formed in a lower end portion. The vertical rotation shaft 9 is supported at two points, i.e. at both edges of the recessed portion 11a for each of the bearings 11.

Further, in the telescope unit 8, a sighting telescope 12 with a distance measuring optical axis is provided, and a distance measuring unit (not shown) is accommodated.

In the frame unit 6, a vertical rotation driving unit 13 with ultrasonic driving is accommodated, and the vertical rotation driving unit 13 is located on an axis of the vertical rotation shaft 9. The vertical rotation driving unit 13 has a vertical output shaft 14 concentric with the vertical rotation shaft 9, and a forward end of the vertical output shaft 14 is connected to the vertical rotation shaft 9.

A base end of the vertical output shaft 14 penetrates the vertical rotation driving unit 13 and protrudes from a side plate of the frame unit 6. The vertical output shaft 14 is rotatable via a bearing component 24, and a fixing nut 15 is screwed to the base end portion of the vertical output shaft 14. Further, a compression spring 16 which is an output-shaft pressing component is interposed between the fixing nut 15 and the bearing component 24, and the vertical output shaft 14 is biased in a direction of the base end side by the compression spring 16.

Further, a whirl-stop unit 17 is provided on the side plate of the frame unit 6. The whirl-stop unit 17 is fixed to the vertical rotation driving unit 13 and connects the vertical rotation driving unit 13 and the frame unit 6 (a fixing portion) to each other. That is, the vertical rotation driving unit 13 is fixed to the frame unit 6 via the whirl-stop unit 17.

The side plate of the frame unit 6 on a side (the right side in FIG. 1) where the vertical rotation driving unit 13 is provided is attachable and detachable. Therefore, in a state where the side plate is removed, the vertical rotation driving unit 13 is arranged to be attachable and detachable with respect to the vertical rotation shaft 9.

Further, a horizontal angle encoder (not shown) is provided on the horizontal rotation shaft 5, and a rotation angle of the horizontal rotation shaft 5 is detected by the horizontal angle encoder. Further, a vertical angle encoder 18 is provided on the vertical rotation shaft 9, and the rotation angle of the vertical rotation shaft 9 is detected by the vertical angle encoder 18.

The horizontal rotation driving unit and the vertical rotation driving unit 13 are configured to be controlled by a control unit (not shown). By cooperating a horizontal rotation of the frame unit 6 and a vertical rotation of the telescope unit 8 with each other, the distance measuring optical axis is directed to an object to be measured. The distance measuring unit projects a distance measuring light via the telescope unit 8, receives a reflection light from the object to be measured and measures a distance. Further, based on detection results of the horizontal angle encoder and the vertical angle encoder 18, a horizontal angle and a vertical angle are measured.

Figure 3:
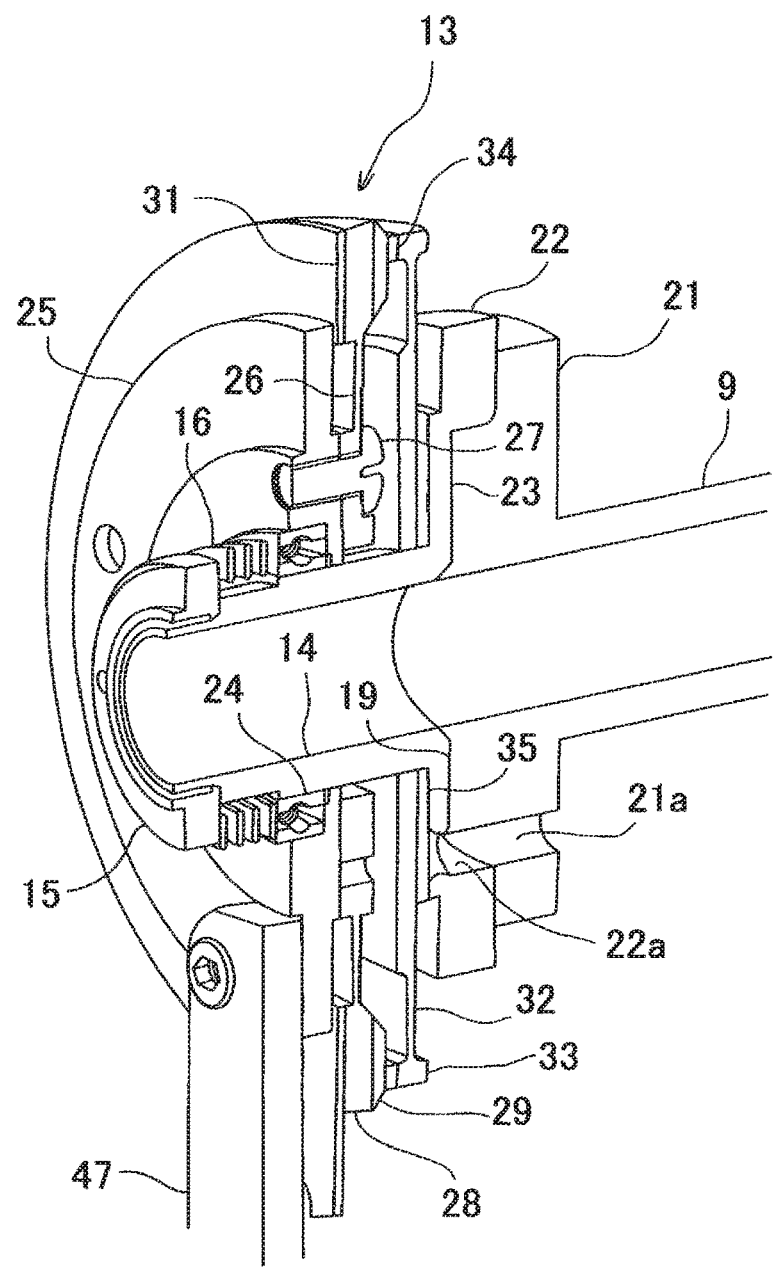
FIG. 3 is a cross-sectional perspective view to show a vertical rotation driving unit of the surveying instrument.

Next, a description will be given on details of the vertical rotation driving unit 13 by referring to FIG. 3.

The vertical rotation shaft 9 and the vertical output shaft 14 are both hollow cylindrical members. A connected projection 19 is formed on the base end of the vertical rotation shaft 9, and a shaft-portion flange 21 is formed continuously to a lower end of the connected projection 19. Further, at the forward end of the vertical output shaft 14, an output flange 22 is formed. A peripheral edge portion of the output flange 22 is thick, and a connected concavity 23 capable of being fitted with the connected projection 19 is formed at a center part of the output flange 22. Further, bolt holes 21a and bolt holes 22a are drilled in the shaft-portion flange 21 and the output flange 22, and the bolt hole 21a and the bolt hole 22a are capable of being aligned on a same axis.

Therefore, the vertical rotation shaft 9 and the vertical output shaft 14 are coupled by a spigot-joint between the connected projection 19 and the connected concavity 23. By being bolted the shaft-portion flange 21 and the output flange 22 via the bolt holes 21a and 22a, the vertical rotation shaft 9 and the vertical output shaft 14 are connected to each other.

A fixing plate 25 designed in a disk-like shape is rotatably and slidably fitted with the vertical output shaft 14 via the bearing component 24 and further, the fixing plate 25 is capable of displacement in an axial direction.

On a forward end surface of the fixing plate 25, an intermediate fixed plate 26 is fixed by a bolt 27. A diameter of the intermediate fixed plate 26 is larger than the fixing plate 25, and on an outer circumferential portion of the intermediate fixed plate 26 extending from the fixing plate 25, a vibration generating component 28 with a ring shape is formed. It is to be noted that, in FIG. 3, although the fixing plate 25 and the vibration generating component 28 are slightly overlapped, a gap is formed between the fixing plate 25 and the vibration generating component 28 so as not to come into contact with each other.

On the forward end surface of the vibration generating component 28, comb teeth 29 are formed over a total circumference. Further, on a base end surface of the vibration generating component 28, a piezoelectric ceramic (a piezoelectric element) 31 with a thin-plate ring shape is fixed in close contact concentrically with the intermediate fixed plate 26.

On a forward end side of the intermediate fixed plate 26, a rotating plate 32 is provided. The rotating plate 32 is rotatably fitted with the vertical output shaft 14, and further, the rotating plate 32 is slidable in the axial direction. On the outer circumferential portion of the rotating plate 32, a ring-shaped rib 33 is formed, and the rib 33 is in close contact with the forward end surface of the vibration generating component 28 via a first friction sheet 34.

Further, on the forward end side of the rotating plate 32, the output flange 22 is located, and a second friction sheet 35 is interposed between the rotating plate 32 and the output flange 22.

Between the fixing nut 15 and the bearing component 24, the compression spring 16 is provided. The compression spring 16 is provided in a compressed state so as to act required pressing forces between the output flange 22 and the rotating plate 32 and between the rib 33 and the vibration generating component 28.

Further, by the pressing force applied by the compression spring 16, a relationship between a friction torque T1, which is generated between the vibration generating component 28 and the rotating plate 32, and a friction torque T2, which is generated between the output flange 22 and the rotating plate 32, is T1>T2. Further, T2 is larger than a driving torque required for the vertical rotation driving unit 13 during a normal operation.

To the piezoelectric ceramic 31, a cable (not shown) is connected so that an electric power is supplied from a power supply unit (not shown) via the cable.

When the electric power is supplied from the power supply unit to the vibration generating component 28, the comb teeth 29 are ultrasonically vibrated, and a relative rotation is generated between the vibration generating component 28 and the rotating plate 32.

As described later, between the fixing plate 25 and the side plate of the frame unit 6, the whirl-stop unit 17 is provided, and a rotation of the fixing plate 25 is restricted. Further, between the rotating plate 32 and the output flange 22, a friction force acts, and the rotating plate 32 and the output flange 22 are rotated integrally.

Therefore, the fixing plate 25 and the intermediate fixed plate 26 function as a stator, and the vertical output shaft 14 (that is, the output flange 22) functions as a rotor. By supplying the electric power to the piezoelectric ceramic 31 and by controlling power supplying, the output flange 22 is rotated in a required direction at a required rotation speed.

It is to be noted that the vertical rotation shaft 9 and the vertical output shaft 14 can be easily connected/disconnected via the shaft-portion flange 21 and the output flange 22. As a result, an assembling of the surveying instrument 1 and the assembling of the vertical rotation driving unit 13 can be carried out in parallel with each other.

Figure 4:
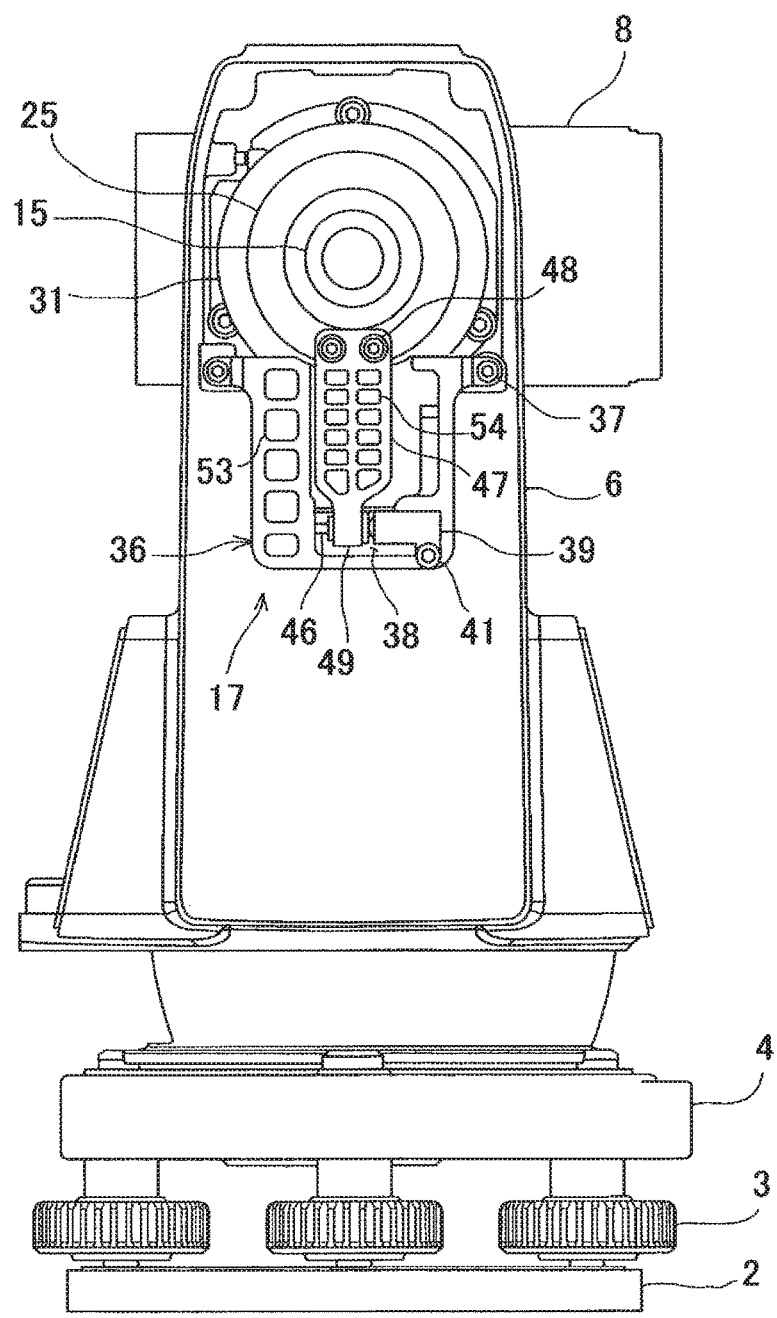
FIG. 4 is a side view to show a state where one of wall surfaces of a frame unit of the surveying instrument is detached.
Figure 5:
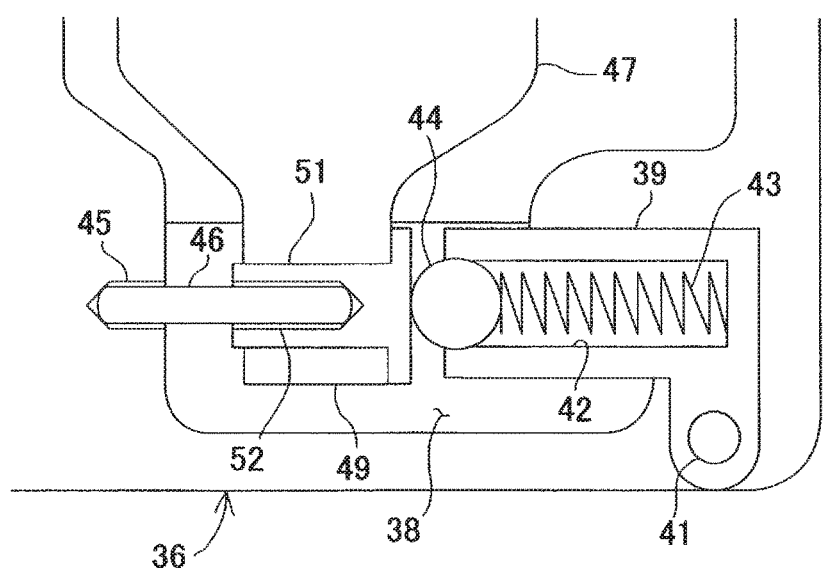
FIG. 5 is an enlarged cross-sectional view of an essential portion of a whirl-stop unit of the surveying instrument.

Next, by referring to FIG. 4 and FIG. 5, a description will be given on the whirl-stop unit 17.

As described above, the vertical rotation driving unit 13 is mounted on the base end of the vertical rotation shaft 9, and a relative rotation is possible between the output flange 22 and the rotating plate 32 and between the fixing plate 25 and the intermediate fixed plate 26. Therefore, in order that the output flange 22 and the rotating plate 32 obtain a rotating force from the vertical output shaft 14, the fixing plate 25 and the intermediate fixed disk 26 needs to be fixed.

The whirl-stop unit 17 connects the fixing plate 25 and the frame unit 6 to each other and restricts a rotation of the fixing plate 25.

The whirl-stop unit 17 has a joint holder 36 with a required length in a vertical direction (a radial direction), and the joint holder 36 is mounted on the frame unit 6 by a bolt 37. The joint holder 36 is manufactured by machining or die-casting, for instance, and has a rigidity and a strength as required.

Further, on a lower part of the joint holder 36, a rectangular hole portion 38 extending in a horizontal direction (a tangential direction of a circle around an axis of the vertical output shaft 14 as a center) is formed.

In the hole portion 38, a ball holder 39 having an inverted L-shaped outer shape is accommodated, and the ball holder 39 is fixed to the joint holder 36 by a bolt 41 at one spot. Further, the ball holder 39 is in contact with an inner surface of the hole portion 38.

In the ball holder 39, a cylindrical hole 42 with an axis in a tangential direction is drilled, and in the cylindrical hole 42, a compression spring 43, which is a steel-ball pressing component, is accommodated in a compressed state. Further, at the forward end of the compression spring 43, a steel ball 44 is provided.

In the inner surface of the hole portion 38 facing the ball holder 39, a pin accommodating hole 45 is drilled so as to be concentric with the cylindrical hole 42, and a hole bottom of the pin accommodating hole 45 is made to be in a conical shape. In the pin accommodating hole 45, a connection pin 46 is inserted. Both ends of the connection pin 46 are formed in a spherical shape.

A diameter of the pin accommodating hole 45 is larger than a diameter of the connection pin 46, and the connection pin 46 is capable of tilting around a base end as the center in a state where the base end portion is fitted with the hole bottom in the conical shape.

To the fixing plate 25, a connection plate 47 with a required length in the vertical direction (the radial direction) and extending to the hole portion 38 is fixed by a bolt 48. The connection plate 47 is manufactured by die-casting, for instance, and has a rigidity and a strength as required.

The connection plate 47 has a connection element holding portion 49 protruded at a lower end thereof. The connection element holding portion 49 holds a cylindrical connection element 51, and the connection element 51 is interposed between the ball holder 39 and the pin accommodating hole 45.

Further, in the connection element 51, a pin receiving hole 52 is drilled so as to be concentric with the pin accommodating hole 45. A hole bottom of the pin receiving hole 52 is made to be in the conical shape. It is to be noted that a diameter of the pin receiving hole 52 is made to be larger than the connection pin 46, for instance, the diameter of the pin receiving hole 52 is made to be equal to the pin accommodating hole 45.

In the pin receiving hole 52, a forward end portion of the connection pin 46 is inserted, and the connection pin 46 is provided by spanning between the pin accommodating hole 45 and the pin receiving hole 52.

On the joint holder 36 and the connection plate 47, a predetermined number of lightening portions 53 and 54 are formed, and it is so designed to reduce weights of the joint holder 36 and the connection plate 47. Further, a thin portion is formed at the center part of the joint holder 36. By being accommodated the connection plate 47 in the thin portion, the joint holder 36 and the connection plate 47 become flush, for instance.

On a side opposite to the pin receiving hole 52, the steel ball 44 comes into contact with a surface of the connection element 51. On a contact surface of the steel ball 44, a pressing force by the compression spring 43 acts, and a pressing reaction force from the connection pin 46 acts on the hole bottom of the pin receiving hole 52.

Therefore, a position in a circumferential direction of the connection plate 47 is determined by the joint holder 36 via the connection pin 46. Further, in a case where the connection plate 47 is displaced in a radial direction with respect to the joint holder 36, the steel ball 44 slides against the connection plate 47, the connection pin 46 tilts, and a displacement of the connection plate 47 is absorbed.

Thus, the whirl-stop unit 17 restricts a rotation of the fixing plate 25 and moreover, if the vertical output shaft 14 is eccentric with respect to the vertical rotation shaft 9, a rotational deviation caused by an eccentricity is absorbed.

Next, a description will be given on a vertical rotation driving by the vertical rotation driving unit 13.

When a voltage is applied to the piezoelectric ceramic 31, the comb teeth 29 are ultrasonically vibrated, and a relative rotation generates between the intermediate fixed plate 26 and the rotating plate 32.

Since the intermediate fixed plate 26 is fixed to the frame unit 6 via the fixing plate 25 and the whirl-stop unit 17, the vertical output shaft 14, that is, the output flange 22 is rotated.

A rotating force of the vertical output shaft 14 is transmitted to the vertical rotation shaft 9 via the output flange 22, and the telescope unit 8 is vertically rotated.

As described above, in the present embodiment, the vertical rotation driving unit 13 is fixed to the frame unit 6 via the whirl-stop unit 17.

Therefore, even in a case where an error occurs when the output flange 22 is mounted on the shaft-portion flange 21 and the vertical output shaft 14 becomes eccentric with respect to the vertical rotation shaft 9, the eccentricity is absorbed by the whirl-stop unit 17, and it is possible to prevent the rotation of the vertical rotation shaft 9 from being influenced by the eccentricity.

Further, even in a case where the vertical rotation driving unit 13 itself has a runout due to a manufacturing error, it is possible to prevent the error of the vertical rotation driving unit 13 itself from influencing a rotation accuracy of the vertical rotation shaft 9.

That is to say, in the present embodiment, there is no need to carry out with high accuracy a mounting of the vertical rotation driving unit 13 to the vertical rotation shaft 9.

Further, since the vertical rotation driving unit 13 is so configured that the connection plate 47 has the required length in the vertical direction, a spring force of the compression spring 43 for generating a torque for restricting the rotation of the fixing plate 25 can be decreased. Therefore, a vertical component force of the compression spring 43 acting on the vertical rotation shaft 9 can be decreased, and it is possible to prevent the vertical rotation shaft 9 from floating from the bearing 11.

Further, since the whirl-stop unit 17 is provided outside of the frame unit 6 and is connected to the vertical rotation driving unit 13 from the outside, a connection between the vertical rotation shaft 9 and the vertical output shaft 14 may be made only by bolting the shaft-portion flange 21 and the output flange 22, and a space inside the frame unit 6 can be saved.

Further, since the whirl-stop unit 17 comprises the joint holder 36, the hole portion 38, the ball holder 39, the pin accommodating hole 45, the connection plate 47, the connection element 51, the pin receiving hole 52, and the connection pin 46, the number of components can be reduced, and a reduction of a manufacturing cost and an improvement of a workability can be realized.

It is to be noted that, in a case where an excessive load is generated in the vertical output shaft 14 during driving of the vertical rotation driving unit 13, e.g., a case where the telescope unit 8 interferes with a foreign object and a rotation of the telescope unit 8 is restricted, since the friction torque T2 between the output flange 22 and the rotating plate 32 is set smaller than the friction torque T1 between the intermediate fixed plate 26 and the rotating plate 32, a slip occurs between the output flange 22 and the rotating plate 32, and only the rotating plate 32 is rotated.

Therefore, such a situation that an excessive load is applied to the vertical rotation driving unit 13 and the vertical rotation driving unit 13 is damaged is prevented. It is to be noted that the fact that the telescope unit 8 is restricted is detected by the vertical angle encoder 18, and the driving of the vertical rotation driving unit 13 is stopped.

Further, in the present embodiment, although a description was given on a case where an ultrasonic motor is used as the vertical rotation driving unit 13, it is needless to say that the ultrasonic motor may be similarly used for the horizontal rotation driving unit (not shown).

The invention claimed is:

1. A surveying instrument comprising: a frame unit provided capable of rotating horizontally via a horizontal rotation shaft, a telescope unit provided capable of rotating vertically via a vertical rotation shaft in a recessed portion formed in said frame unit, a vertical rotation driving unit in which a vertical output shaft is connected to said vertical rotation shaft, and a whirl-stop unit provided on an outer side of a side plate of said frame unit along said side plate and connecting a stator of said vertical rotation driving unit and said frame unit to each other, wherein said whirl-stop unit restricts a rotation of said stator.

2. The surveying instrument according to claim 1, wherein said stator comprises a fixing plate and an intermediate fixed plate, wherein said vertical rotation driving unit comprises said vertical output shaft in which a forward end portion is connected to said vertical rotation shaft via an output flange, and a base end portion protrudes from said frame unit and a fixing nut is screwed thereon, said fixing plate fitted rotatably and slidably with said vertical output shaft, an output-shaft pressing component interposed between said fixing plate and said fixing nut, said intermediate fixed plate fixed to said fixing plate, a vibration generating component provided on an outer circumferential portion of said intermediate fixed plate, and a rotating plate fitted rotatably and slidably with said vertical output shaft, and wherein said rotating plate is in close contact with said vibration generating component via a first friction component by a pressing force from said output-shaft pressing component and is in close contact with said output flange via a second friction component generating a friction torque smaller than the friction torque of said first friction component.

3. The surveying instrument according to claim 2, wherein said whirl-stop unit comprises a joint holder fixed to said frame unit, a hole portion formed in a lower part of said joint holder, a ball holder having a steel ball accommodated in said hole portion and pressed by a steel-ball pressing component, a pin accommodating hole formed in an inner surface of said hole portion facing said ball holder, a connection plate fixed to said fixing plate and extending downward to said hole portion, a connection element held by said connection plate so as to be located between said ball holder and said pin accommodating hole, a pin receiving hole drilled in said connection element and concentric with said pin accommodating hole, and a connection pin provided by spanning between said pin accommodating hole and said pin receiving hole, and wherein said steel ball comes into contact on a side opposite to said pin receiving hole with a surface of said connect on element.

4. The surveying instrument according to claim 3, wherein diameters of said pin accommodating hole and said pin receiving hole are larger than the diameter of said connection pin.

5. The surveying instrument according to claim 4, wherein both ends of said connection pin are in a spherical shape, and hole bottoms of said pin accommodating hole and said pin receiving hole are in a conical shape.

* * * * *